United States Patent
Fujii

(10) Patent No.: US 8,918,147 B2
(45) Date of Patent: Dec. 23, 2014

(54) MOBILE TERMINAL DEVICE

(71) Applicant: KYOCERA Corporation, Kyoto-shi, Kyoto (JP)

(72) Inventor: Katsushige Fujii, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/100,453

(22) Filed: Dec. 9, 2013

(65) Prior Publication Data

US 2014/0098052 A1    Apr. 10, 2014

Related U.S. Application Data

(63) Continuation of application No. 12/913,172, filed on Oct. 27, 2010, now abandoned.

(30) Foreign Application Priority Data

Oct. 27, 2009    (JP) .................. 2009-246098

(51) Int. Cl.
| H04M 1/00 | (2006.01) |
| H04M 3/00 | (2006.01) |
| G06F 3/041 | (2006.01) |
| H04W 52/02 | (2009.01) |
| H04M 1/57 | (2006.01) |

(52) U.S. Cl.
CPC ........... *G06F 3/041* (2013.01); *H04W 52/0277* (2013.01); *H04M 1/576* (2013.01); *H04M 2250/16* (2013.01)
USPC ......................................... 455/566; 455/418

(58) Field of Classification Search
CPC .............. H04M 1/67; H04M 2250/22; H04M 1/72577; H04M 2201/38; H04W 12/08; H04W 12/06; H04W 12/02
USPC ................ 455/410–11, 565–567; 379/433.04
See application file for complete search history.

(56) References Cited

U.S. PATENT DOCUMENTS

| 8,155,635 | B2 | 4/2012 | Hsieh et al. |
| 2009/0091544 | A1 | 4/2009 | Lindroos |
| 2009/0197615 | A1 | 8/2009 | Kim et al. |
| 2010/0001967 | A1 | 1/2010 | Yoo |
| 2010/0298033 | A1 | 11/2010 | Lee |

FOREIGN PATENT DOCUMENTS

| EP | 1775925 A2 | 4/2007 |
| EP | 1775925 A3 | 4/2007 |
| JP | 2002-044202 A | 2/2002 |
| JP | 2002044202 A | 2/2002 |
| JP | 2002-135369 A | 5/2002 |
| JP | 2002135369 A | 5/2002 |
| JP | 2003-263251 A | 9/2003 |
| JP | 2003-302957 A | 10/2003 |
| JP | 200302957 A | 10/2003 |
| JP | 2006-039485 A | 2/2006 |
| JP | 2006039485 A | 2/2006 |
| JP | 2006-107194 A | 4/2006 |
| JP | 2006-311224 A | 11/2006 |
| JP | 2006311224 A | 11/2006 |
| JP | 2009-071588 A | 4/2009 |

*Primary Examiner* — George Eng
*Assistant Examiner* — Nam Huynh
(74) *Attorney, Agent, or Firm* — Procopio, Cory, Hargreaves & Savitch LLP

(57) ABSTRACT

A method for touch panel operation is disclosed. A touch is detected on a first touch panel, and reception of input from the first touch panel is prevented based on a predetermined deactivating operation.

8 Claims, 12 Drawing Sheets

MOBILE TERMINAL DEVICE

CROSS-REFERENCE TO RELATED APPLICATION

The present application is a continuation of U.S. patent application Ser. No. 12/913,172, filed on Oct. 27, 2010, which claims priority under 35 U.S.C. §119 to Japanese Patent Application No. 2009-246098, filed on Oct. 27, 2009, entitled "MOBILE TERMINAL DEVICE". The content of which is incorporated by reference herein in its entirety.

FIELD

Embodiments of the present disclosure relate generally to mobile electronic devices, and more particularly relate to mobile electronic devices with touch panels.

BACKGROUND

Mobile terminal devices with touch panels are well-known. If the mobile terminal device has a plurality of touch panels, a touch panel other than the touch panel being operated may be operated by mistake.

SUMMARY

A method for touch panel operation is disclosed. A touch is detected on a first touch panel, and reception of input from the first touch panel is prevented based on a predetermined deactivating operation.

In a first embodiment, a mobile terminal device comprises a display module comprising a display panel thereon. A detection module is operable to detect a detected touch on the display module to obtain an input, and a control processing module is operable to perform control based on the detected touch. The control processing module is further operable to prevent reception of the input from the detection module based on a predetermined deactivating operation.

In a second embodiment, a method for operating a dual touch panel mobile terminal device comprises detecting a touch on a first touch panel to obtain a detected touch input; and preventing reception of input from the first touch panel based on a predetermined deactivating operation.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, a cell phone. Embodiments of the disclosure, however, are not limited to such cell phone, and the techniques described herein may also be utilized in other applications. For example, embodiments may be applicable to digital books, digital cameras, electronic game machines, digital music players, personal digital assistance (PDA), personal handy phone system (PHS), lap top computers, tablet PCs, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
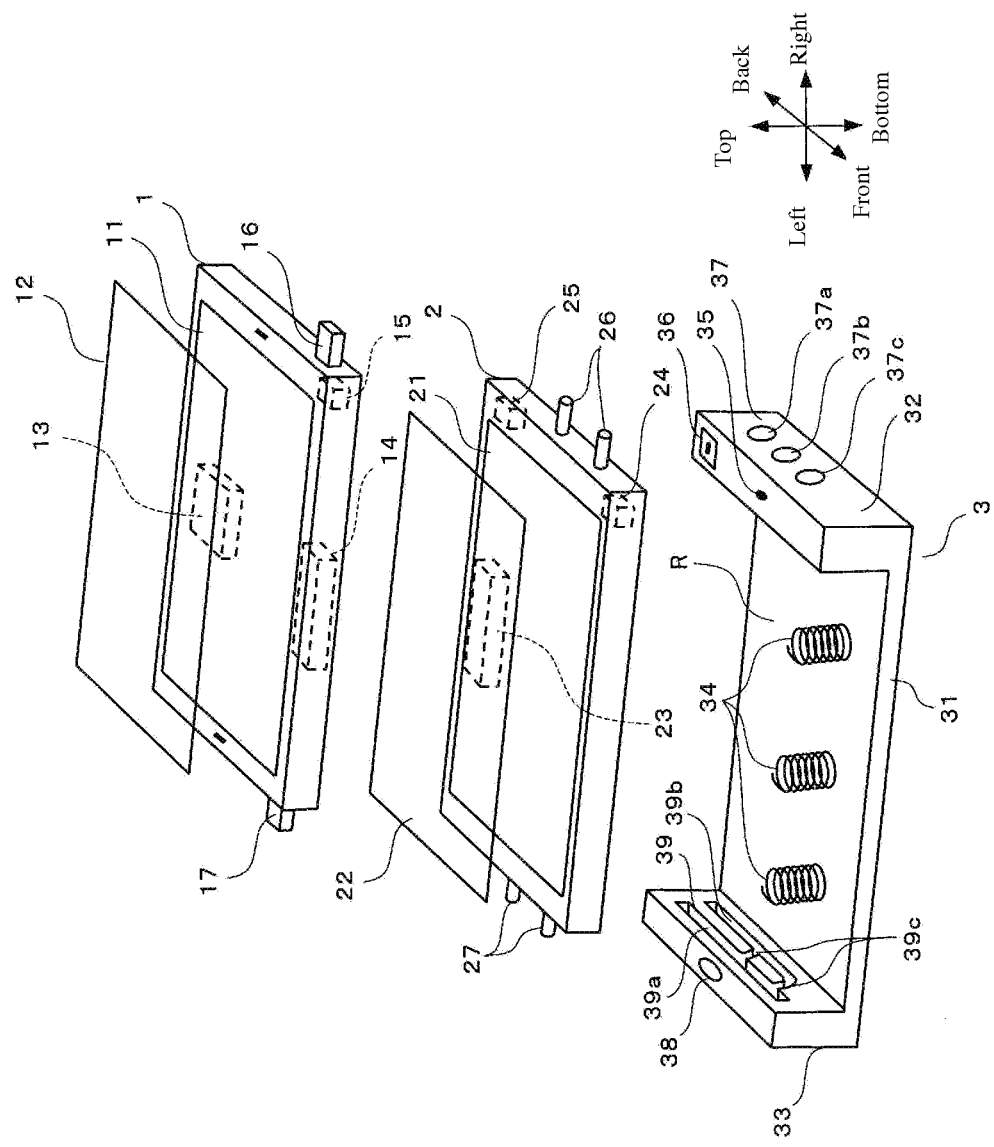
FIG. 1 is an illustration of an exemplary expanded external view of the cell phone according to an embodiment of the disclosure.
Figure 2:
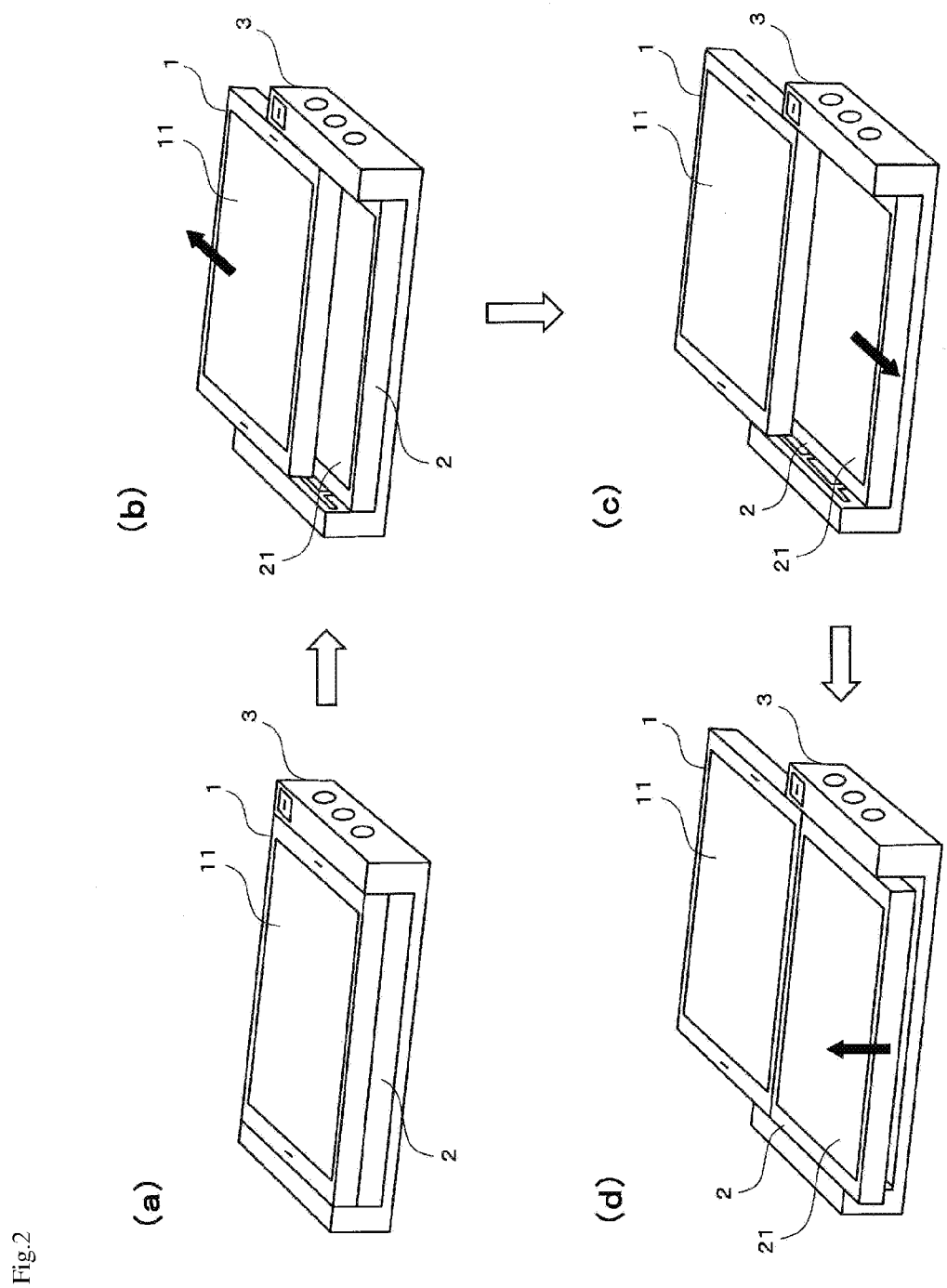
FIGS. 2A-2D are illustrations of exemplary diagrams showing a second cabinet switching from a closed state to an open state according to an embodiment of the disclosure.

FIG. 1 is an illustration of an exemplary expended external view of the cell phone according to an embodiment of the disclosure. The cell phone comprises a first cabinet 1, a second cabinet 2, and a support 3 holding those first and second cabinets 1 and 2.

The first cabinet 1 has a horizontally long rectangular parallelepiped-shape. A first display 11 is placed on the first cabinet 1. The display surface of the first display 11 is placed on the front side of the first cabinet 1. The first display 11 has a first liquid crystal panel 11a, and a first backlight 11b that illuminates the first liquid crystal panel 11a.

A first touch panel 12 is placed on the front of the first display 11. The first touch panel 12 is a sheet-shaped transparent member. A user can view a display screen displayed on the display 11 through the first touch panel 12.

The first touch panel 12 has a first transparent electrode and a second transparent electrode. The first transparent electrode and the second transparent electrode are arranged in a matrix-like manner. The first touch panel 12 detects a change in capacitance between the first transparent electrode and the second transparent electrode. The first touch panel 12 detects a position on the display, which is touched by the user, based on the detected change in capacitance. The first touch panel 12 outputs a position signal according to the detected position.

Within the first cabinet 1, a camera module 13 is placed in a slightly rearward position in the middle. The camera module 13 has a lens window (not shown) for taking a subject image. The lens window is placed on the rear side of the first cabinet 1. Within the first cabinet 1, a magnet 14 is placed in the middle position in the vicinity of the front surface. Within the first cabinet 1, a magnet 15 is placed on the right front corner. Moreover, protrusions 16 and 17 are placed on the right side and the left side of the first cabinet 1, respectively.

The second cabinet 2 has a horizontally long rectangular parallelepiped-shape. That is, the second cabinet 2 has the substantially same shape and size as the first cabinet 1. A second display 21 is placed on the second cabinet 2. The display surface of the second display 21 is placed on the front side of the second cabinet 2. The second display 21 has a second liquid crystal panel 21a, and a second backlight 21b that illuminates the second liquid crystal panel 21a. The first display 11 and the second display 21 may be other display elements such as an organic EL.

A second touch panel 22 is placed on the front side of the second display 21. The configuration of the second touch panel 22 is the same as that of the first touch panel 12.

Within the second cabinet 2, a magnet 23 is placed in a central position in the vicinity of the rear surface. The magnet 23 and the magnet 14 attract each other when the first cabinet 1 and the second cabinet 2 enter an opened state (open state). When the first cabinet 1 and the second cabinet 2 are in an open state, the first display 11 and the second display 21 constitute one large screen. When either one of the magnet 23 and the magnet 14 is a magnet with a great magnetic force, the other remaining one may be a magnetic body.

Within the second cabinet 2, a closing sensor 24 is placed on the right front corner. Within the second cabinet 2, an opening sensor 25 is placed on the right rear corner. The closing sensor 24 and the opening sensor 25 are, for example, hole ICs, and output a detection signal in response to the magnetic force of the magnet. When the first cabinet 1 and the second cabinet 2 are in an overlapping state, the magnet 15 of the first cabinet 1 moves closer to the closing sensor 24. At this time, an ON signal is output from the closing sensor 24. On the other hand, when the first cabinet 1 and the second cabinet 2 enter a state, in which they are positioned in a queue one after the other, the magnet 15 of the first cabinet 1 moves closer to the opening sensor 25. At this time, an ON signal is output from the opening sensor 25.

Moreover, two shafts 26 are placed on the right side of the second cabinet 2. Two shafts 27 are provided on the left side of the second cabinet 2.

The support 3 comprises a bottom plate module 31, a right supporting module 32 formed on the right end of the bottom plate module 31, and a left supporting module 33 formed on the left end of the bottom plate module 31. The first cabinet 1 and the second cabinet 2 are contained in a vertically overlapping state within a contained area R, which is surrounded by the bottom plate module 31, the right supporting module 32, and the left supporting module 33.

Three coil springs 34 are arranged such that they line up in a horizontal direction on the bottom plate module 31. Those coil springs 34 abut on the bottom surface of the second cabinet 2 in a state, in which the second cabinet 2 is attached to the support 3. The coil springs 34 provide a force to push up the abutting second cabinet 2.

A microphone 35 and a power key 36 are arranged on the upper surface of the right supporting module 32. In addition, an operation key group 37 is arranged on the external surface of the right supporting module 32. The operation key group 37 consists of, for example, three operation keys 37a, 37b, and 37c. A certain function such as silent mode setting is executed by operating these operation keys without operating the touch panels 12 and 22. A phone speaker 38 is arranged on the upper surface of the left supporting module 33. A user makes a phone call holding the cell phone such that the left supporting module 33 becomes closer to the user's ear, and the right supporting module 32 becomes closer to the user's mouth.

A guiding groove 39 (only shown on the side of the left supporting module 33) is formed on the internal surface of the right supporting module 32 and the left supporting module 33. The guiding groove 39 consists of an upper groove 39a and a lower groove 39b extending in a front-back direction, and two longitudinal grooves 39c, formed on the front side of the groove, that extend up and down such that they are connected to the upper groove 39a and the lower groove 39b.

When the cell phone is assembled, the second cabinet 2 is placed within the accommodated area R of the support 3 such that the shafts 26 and 27 are inserted into the lower groove 39b of the guiding groove 39. Moreover, the first cabinet 1 is placed within the contained area R of the support 3, as well as on the second cabinet 2, such that the protrusions 16 and 17 are inserted into the upper groove 39a of the guiding groove 39.

In this way, the first cabinet 1 can slide back and forth by being guided by the upper groove 39a. In addition, the second cabinet 2 can slide back and forth by being guided by the lower groove 39b. Moreover, when the second cabinet 2 moves forward and the shafts 26 and 27 reach the longitudinal groove 39c, the second cabinet 2 can slide vertically by being guided by the longitudinal groove 39c.

FIGS. 2A-2D are illustrations of exemplary diagrams showing a second cabinet switching from a closed state to an open state according to an embodiment of the disclosure.

In the initial state, as shown in the same figure (a), the state is such that the second cabinet 2 is hidden in the back of the first cabinet 1. In this state (closed state), the first display 11 is exposed to the outside. The switching operation is carried out manually by a user.

First, the user moves the first cabinet 1 backward (in the direction of the arrow) as shown in the same figure (b). When the backward movement of the first cabinet 1 is completed, the second cabinet 2 is then pulled forward as shown in the same figure (c). By this withdrawing operation, the second cabinet 2 moves to a position, in which it is not totally overlapped with the first cabinet 1, i.e., a position in which it is lined up in front of the first cabinet 1. At this time, as described above, the shafts 26 and 27 come to the longitudinal groove 39c; hence, the second cabinet 2 is pushed up by the coil spring 33 and lifted upwards. At this time, a greater lifting force is applied by the magnet 14 and the magnet 23, which are attracted to each other. In this way, when the second cabinet 2 is in a completely open state (open state), as shown in the same figure (d), the first cabinet 1 and the second cabinet 2 are lined up such that they are attached firmly to each other one after the other, and such that they are flush with each other. The first display 11 and the second display 21 are integrated to become the form of a large screen.

Figure 3:
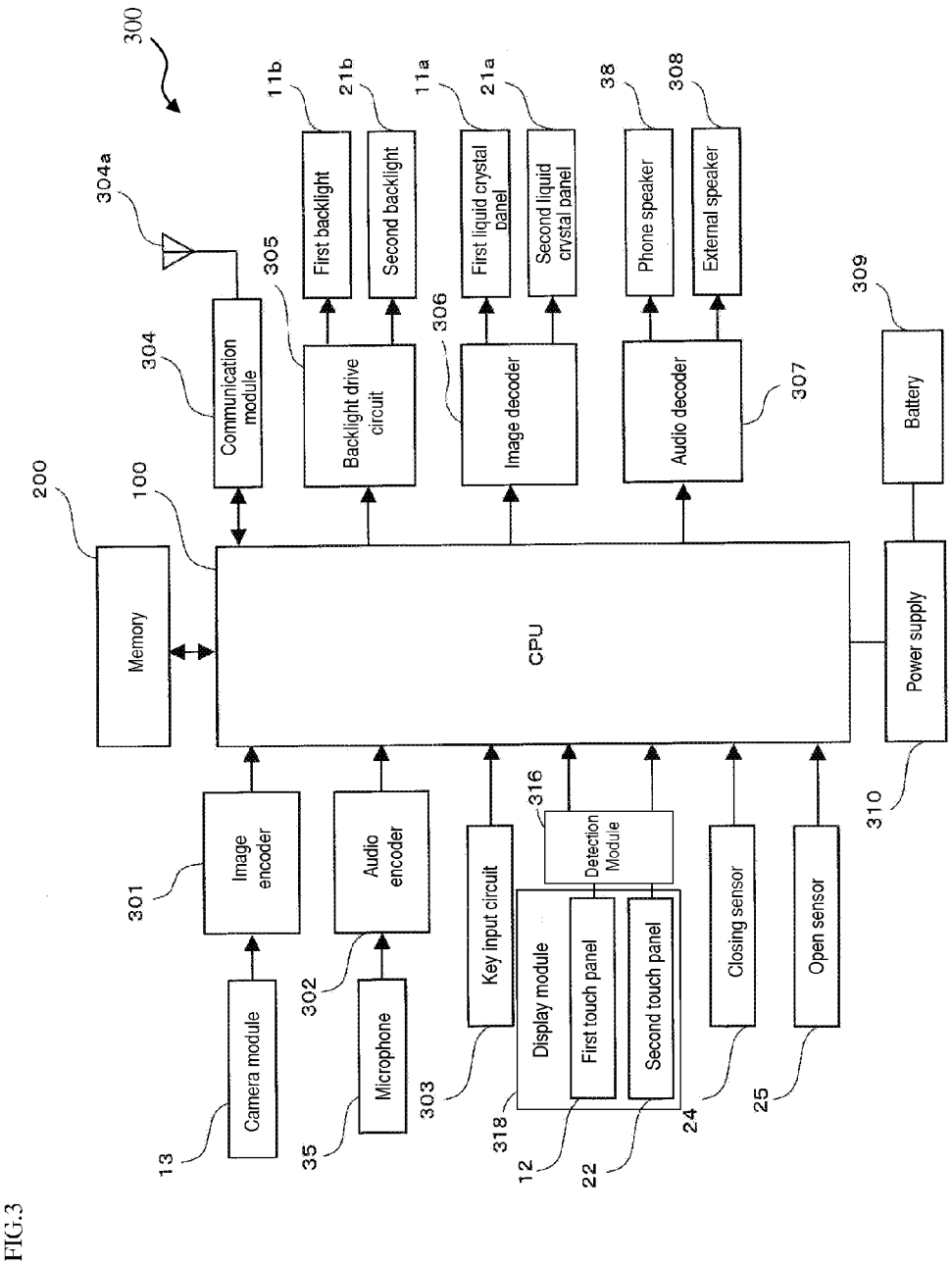
FIG. 3 is an illustration of an exemplary functional block diagram of a cell phone according to an embodiment of the disclosure.

FIG. 3 is an illustration of an exemplary functional block diagram of a cell phone 300 according to an embodiment of the disclosure. The cell phone 300 may have functions, material, and structures that are similar to the embodiments shown in FIGS. 1-2. Therefore common features, functions, and elements may not be redundantly described here. The cell phone may comprise, a CPU 100 (control processing module 100), a memory module 200, an image encoder 301, an audio encoder 302, a key input circuit 303, a communication module 304, a backlight drive circuit 305, an image decoder 306, an audio decoder 307, an external speaker 308, a battery 309, and a power supply 310, detection module 316, and a display module 318.

The detection module 316 detects a detected touch on the display module 318 to obtain a detected input.

The display module 318 comprises touch panels 11/22, and may be, for example but without limitation, a liquid crystal display (LCD), organic electro-luminescence (EL), an organic light emitting diode (OLED), and the like. Various kinds of information can be displayed on the display module 318 via an image/video signal supplied from the CPU 100 such as but without limitation, a state of the cell phone 300, details of user operation, a telephone number of the destination, display of e-mail contents, game screen, date, time, remaining battery level, success and failure of the transmission, standby screen, and the like.

The camera module 13 comprises an image element such as a CCD. The camera module 13 digitizes the imaging signal output from the imaging element, performs various corrections such as gamma correction on that imaging signal, and outputs corrected imaging signal to the image encoder 301. The image encoder 301 performs an encoding processing on the corrected imaging signal from the camera module 13, and outputs a decoded image signal to the CPU 100.

The microphone 35 converts collected audio to an audio signal, and outputs the audio signal to the audio encoder 302. The audio encoder 302 converts an analog audio signal from the microphone 35 to a digital audio signal, performs the encoding processing on the digital audio signal, and outputs an encoded digital audio signal to the CPU 100.

The key input circuit 303 outputs input signal according to each key to the CPU 100 when the power key 36 and each key of the operation key group 37 are operated.

The communication module 304 is operable to transmit and receive a plurality of communication signals comprising data signals via a base station. The communication module 304 communicates with the wireless network via a wireless data communication link (not shown). The communication module 51 cooperates with a base station transceiver (not shown) with a suitably configured RF antenna arrangement 304a that can support a particular wireless communication protocol and modulation scheme to transmit and receive the data signals form and to the CPU 100. The data signals may comprise, for example but without limitation, voice data during voice communication, image signal, text data during email, web data during accessing web site, and the like. The various data comprise.

The backlight drive circuit 305 feeds a voltage signal according to a control signal from the CPU 100 to the first backlight 11b and the second backlight 21b. The first backlight 11b lights up according to the voltage signal from the backlight drive circuit 305, and illuminates the first liquid crystal panel 11a. The second backlight 21b lights up according to the voltage signal from the backlight drive circuit 305, and illuminates the second liquid crystal panel 21a. In one embodiment, the second backlight 21b may light up when the cabinets start to be opened from the closed state, or may light up when the cabinets have reached an open state, or before they reach an open state (for example, the state of FIG. 2(c)).

The image decoder 306 converts an image signal from the CPU 100 to an analog or digital image signal that can be displayed on the first liquid crystal panel 11a and the second liquid crystal panel 21a, and outputs the converted image signal to the liquid crystal panels 11a and 21a. The first liquid crystal panel 11a and the second liquid crystal panel 21a display an image (display screen) according to the image signal on each display screen.

The audio decoder 307 performs decoding processing on an audio signal from the CPU 100, and additionally converts the decoded audio signal into an analog audio signal to output it to the phone speaker 38. Moreover, the audio decoder 307 performs the decoding processing on an audio signal of an annunciation sound such as a ring alert from the CPU 100, an alarm, etc., and additionally converts it to an analog audio signal to output it to the external speaker 308. The phone speaker 38 plays back the audio signal from the audio decoder 307 as an audio. The external speaker 308 plays back the audio signal from the audio decoder 307 as, for example, a ring alert.

The battery 309 is a secondary battery that supplies power to the CPU 100 or each module other than the CPU 100. The battery 309 is coupled to the power supply 310.

The power supply 310 converts the voltage of the battery 309 to a voltage level necessary for each module, and then supplies it to each module. The power supply 310 supplies the power supplied through an input module (not shown) of an external power supply to the battery 309 to charge the battery 309.

The memory module 200 may be any suitable data storage area with suitable amount of memory that is formatted to support the operation of the cell phone 300. The memory module 200 is configured to store, maintain, and provide data as needed to support the functionality of the cell phone 300 in the manner described below. In practical embodiments, the memory module 200 may comprise, for example but without limitation, a non-volatile storage device (non-volatile semiconductor memory, hard disk device, optical disk device, and the like), a random access storage device (for example, SRAM, DRAM), HDD, or any other form of storage medium known in the art. The memory module 200 stores, for example but without limitation, a computer program to be executed by the CPU 100, an address book for managing personal information such as a phone number, e-mail address, etc. of the other person who is communicated with, an audio file for playing a ring alert or alarm, an image file for the standby screen, various setting data, temporary data used in the course of program processing, etc. Moreover, image data captured by the camera module 13, image data taken externally through the communication module 304, text data (e-mail data), etc., are also stored in the memory module 200 in a predetermined file format. The memory module 200 may be coupled to the CPU 100 such that the CPU 100 can read information from and write information to the memory module 200. As an example, the CPU 100 and memory module 200 may reside in their respective ASICs. The memory module 200 may also be integrated into the CPU 100. In an embodiment, the memory module 200 may comprise a cache memory for storing temporary variables or other intermediate information during execution of instructions to be executed by the CPU 100.

The CPU 100 is configured to support functions of the cell phone 300. For example, the CPU 100 may control operations of the cell phone 300 so that processes of the cell phone 300 are suitably performed. These operations may comprise operation of, for example but without limitation, the camera module 13, the microphone 35, the communication module 304, the liquid crystal panels (touch panels) 11a and 21a, the phone speaker 38, the external speaker 308, etc, the key input circuit 303, as well as the first touch panel 12, and the second touch panel 22. Thus, the CPU 100 executes various functions (applications) such as the phone call function, e-mail function, etc. Furthermore, p the CPU 100, controls, for example but without limitation, transmission/reception of signals by the communication module 304, display of images by the display module 318, and the like. In an embodiment, the CPU 100 generates a display screen to be displayed on each of the first display 11 and the second display 21 within the work area provisioned in the memory module 200, and outputs an image signal for configuring the display screen. The CPU 100, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the CPU 100 comprises processing logic that is configured to carry out the functions, techniques, and processing tasks associated with the operation of cell phone 300 such as performing control based on the detected touch to prevent reception of the detected input (non-operating state) based on a predetermined deactivating operation as explained in more detail below. In one embodiment, the CPU is at a location separate from the detection module 316, and carries out a prohibition (non-operating state) and canceling prohibition (operating state) operation of the reception of the input through the detection module 316.

Figure 4:
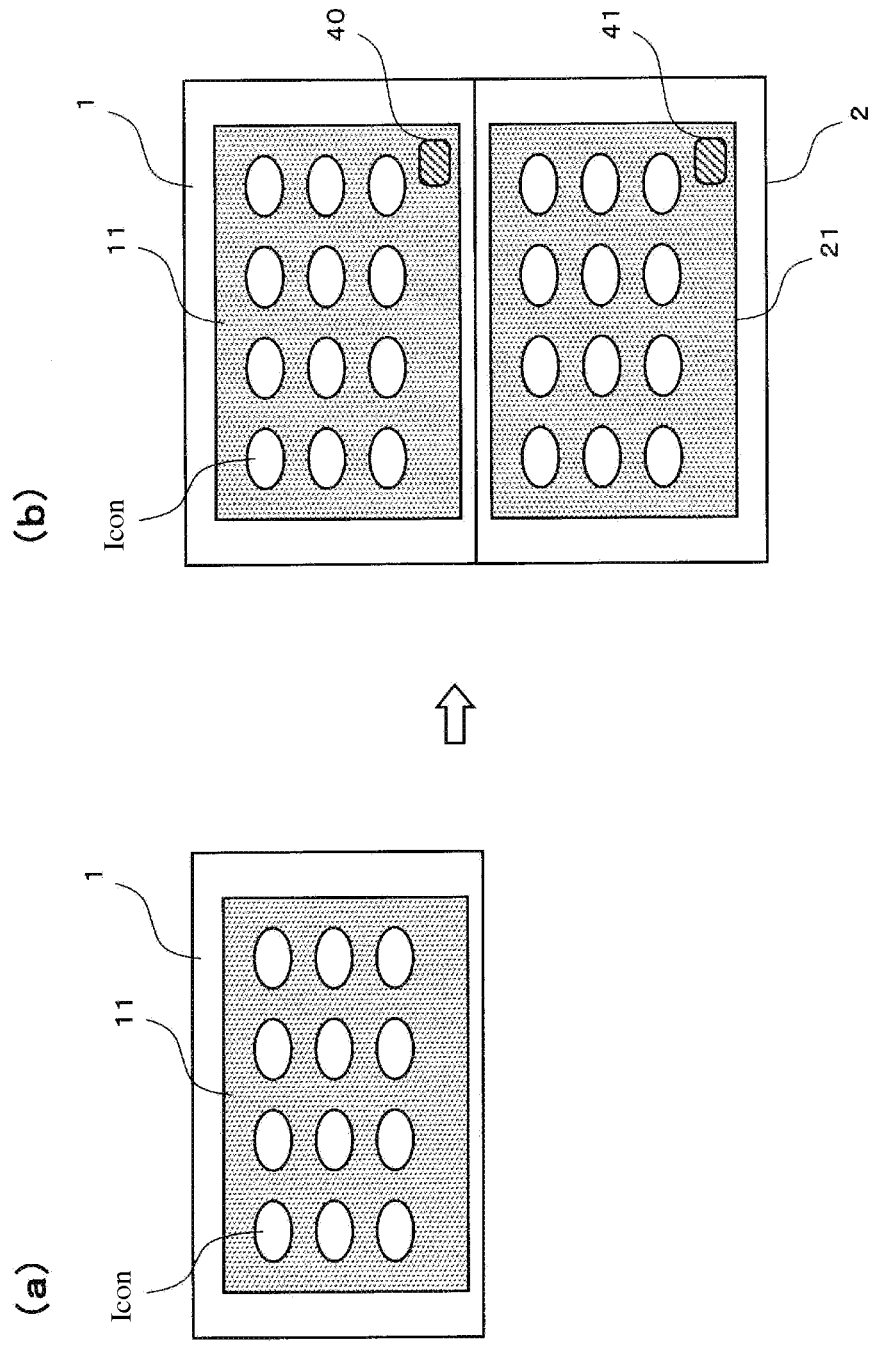
FIGS. 4A-4B are illustrations of exemplary diagrams showing a display panel displayed on a first display and a second display according to an embodiment of the disclosure

FIGS. 4A-4B are illustrations of exemplary diagrams showing a display screen displayed on a first display and a second display according to an embodiment of the disclosure. When the second cabinet 2 is closed (closed state), a display screen is displayed on the first display 11. For example, a menu screen is displayed on the first display 11 as an initial screen. On the menu screen, for example, icons for executing various applications are displayed as shown in FIG. 4(a). In addition to the applications registered beforehand, applications are available by, for example, download through the Internet. Obtained applications are added to the cell phone by installation. In the event that a large number of applications are registered beforehand or the number of applications increases, the icons corresponding to those applications cannot be displayed on one display screen. In this case, as shown in FIG. 4(b), when the second cabinet 2 is opened to form a display state with the first display 11 and the second display 21, icons that could not be displayed on the first display 11 are displayed on the second display 21.

The user can run a desired application on the first display 11 or the second display by touching by a finger a desired icon displayed on the first display 11 or the second display 21. When trying to operate an icon on the first display 11, there is a risk of touching by mistake the icons on the second display 21 by, for example, the user's hand, and the unintended application may be executed.

Therefore, in order to reduce such an erroneous operation, a first sleep key 40 and a second sleep key 41 are arranged as a soft key (icon) on the first display 11 and the second display 21 in the open state, respectively. The sleep keys 40 and 41 are, for example, displayed in the vicinity of the corner of each display 11 and 21 (displayed on the right foreground position when viewed from the position of the user's operation). When the user presses a sleep key of the display that the user is not operating, the sleep mode is set, and thereafter, operational input to that display (touch panel) is not accepted (non-operating state). In addition, this sleep key is configured such that this is not displayed in the closed state.

Figure 5:
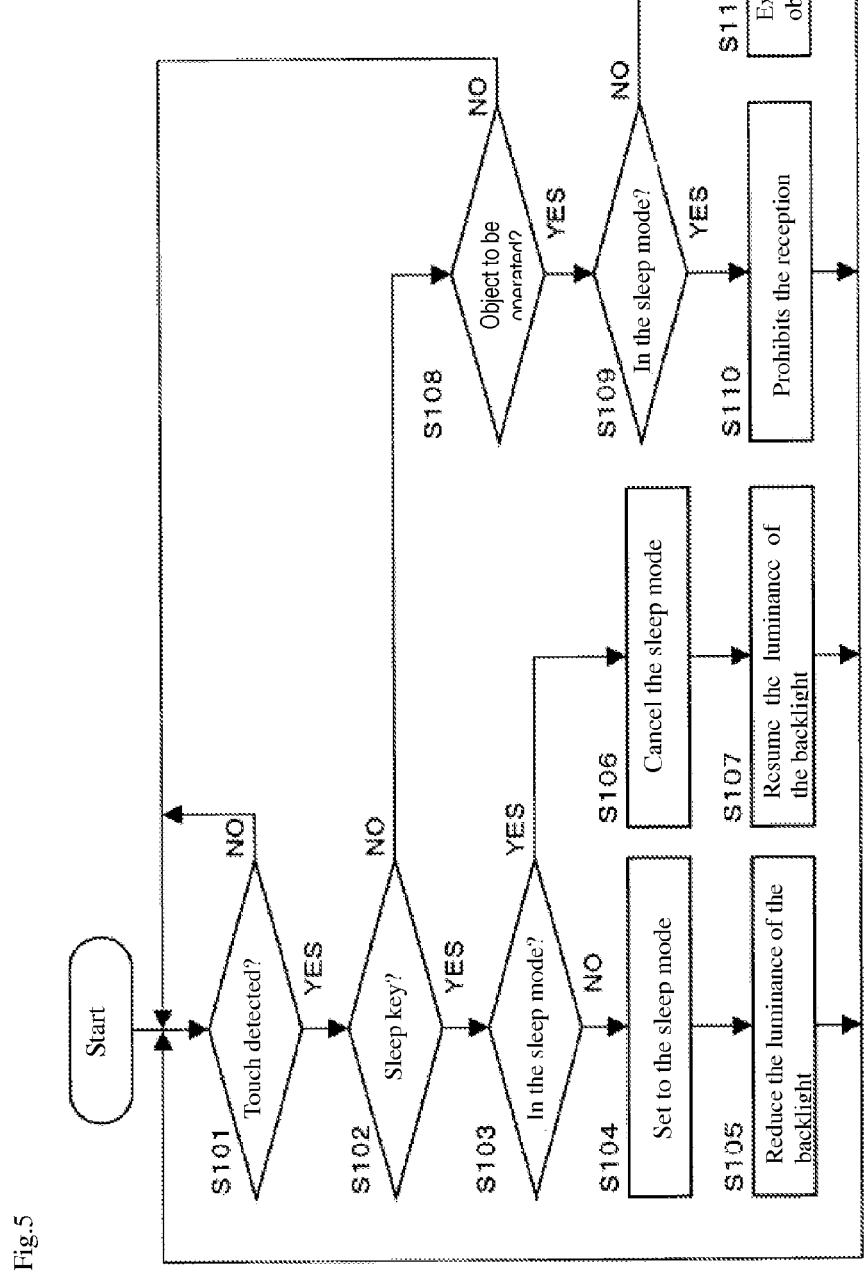
FIG. 5 is an illustration of an exemplary flowchart showing reception processing of an operation according to an embodiment of the disclosure.

FIG. 5 is an illustration of an exemplary flowchart showing a reception process 500 of the operational input by the CPU 100 according to an embodiment of the disclosure. FIGS. 6A-6B are illustrations of exemplary diagrams showing a display example of a first display and a second display when the sleep mode is set according to an embodiment of the disclosure. The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a CPU such as the CPU 100 in which the computer-readable medium is stored. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. For illustrative purposes, the following description of process 500 may refer to elements mentioned above in connection with FIGS. 1-4. In practical embodiments, portions of process 500 may be performed by different elements of the cell phone 1 and 300 for example the a CPU 100, a memory module 200, an image encoder 301, an audio encoder 302, a key input circuit 303, a communication module 304, a backlight drive circuit 305, an image decoder 306, an audio decoder 307, an external speaker 308, a battery 309, and a power supply 310, first touch panel 12, the second touch panel 22, the first sleep key 40, the second sleep key 41 etc. The process 500 may have functions, material, and structures that are similar to the embodiments shown in FIGS. 1-4. Therefore common features, functions, and elements may not be redundantly described here.

Process 500 may begin by the CPU 100 detecting whether or not the first touch panel 12 or the second touch panel 22 is touched (inquiry task S101). If either of the touch panels is touched, the CPU 100 determines, based on the position information from the touched touch panel, whether or not the first sleep key 40 or the second sleep key 41 is touched (inquiry task S102).

If it is determined that the first sleep key 40 or the second sleep key 41 is touched (YES branch of inquiry task S102), the CPU 100 determines whether or not the display on which the touched sleep key is located is currently in the sleep mode (inquiry task S103). If the display is not in the sleep mode (NO branch of inquiry task S103), the display (touch panel) is set to the sleep mode (task S104). The CPU 100 then reduces the current supplied to the backlight of the display to reduce the luminance of the backlight (task S105).

However, if the display on which the touched sleep key is located is currently in the sleep mode (YES branch of inquiry task S103), the CPU 100 cancels the sleep mode of the display (task S106), and resumes the luminance of the backlight of the display to a normal state (task S107).

Figure 6:
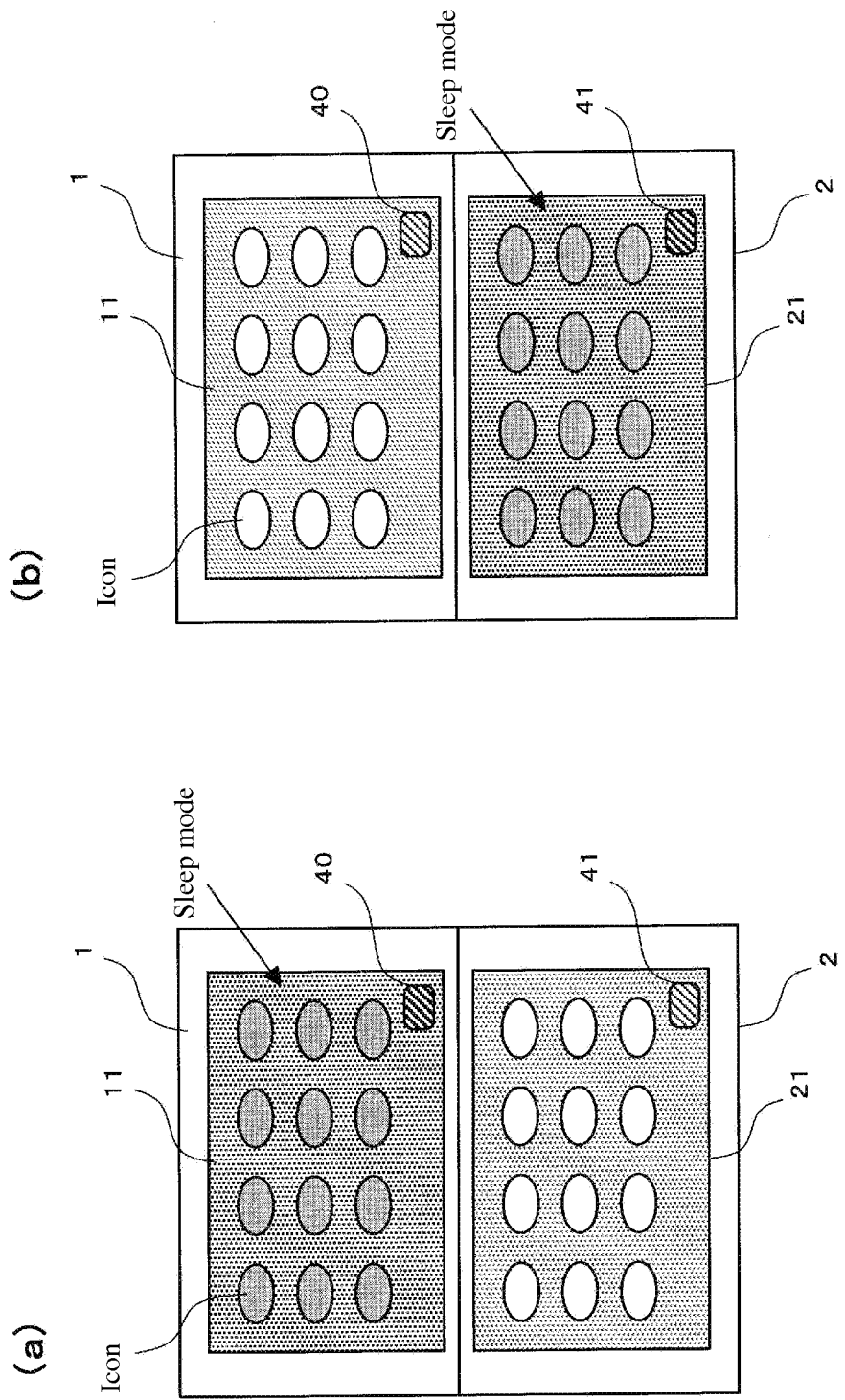
FIGS. 6A-6B are illustrations of exemplary diagrams showing a display example of a first display and a second display if the sleep mode is set according to an embodiment of the disclosure.

In the normal state (a state in which the sleep mode is cancelled), when the sleep key 40 is touched by the user, as shown in FIG. 6(*a*), the first display 11 (the first touch panel 12) is set to the sleep mode. At the same time, the luminance of the first display 11 is reduced and the display becomes dark.

On the other hand, when the sleep key 41 is touched by the user, as shown in FIG. 6(*b*), the second display 21 is set to the sleep mode. At the same time, the luminance of the second display 21 is reduced and the display becomes dark. Even in the state in which the luminance is reduced, the display is not turned off, and the screen display shows icons continuously.

If it is determined that the touched key is not the sleep key 40 or 41 (NO branch of inquiry task S102), the CPU 100 determines whether or not an object (such as an icon for executing an application to be displayed on the display 11 or 21), is touched to be activated/operated (inquiry task S108). If it is determined that the object is touched (YES branch of inquiry task S108), the CPU 100 determines whether or not the cabinet comprising the touched display, i.e., the cabinet comprising the touch panel is in the sleep mode (inquiry task S109). If it is determined that the object is not touched (NO branch of inquiry task S108), the CPU 100 again detects whether or not the first touch panel 12 or the second touch panel 22 is touched (task S101).

If the touch panel in the sleep mode is touched, process 500 considers that the touch panel is mistakenly touched by the user. If the touched touch panel is in the sleep mode (YES branch of inquiry task S109), the CPU 100 prohibits/prevents the object from receiving the activation input (task S110) thereby preventing activation of the corresponding operation by the object. In this manner process 500 performs a predetermined deactivating operation.

If a touch to the touch panel in the sleep mode is detected, the CPU 100 may indicate, on the display that is not in the sleep mode that the reception of the operation for the other display is prohibited. Moreover, in addition to, or alternatively, an annunciation of the prevention/prohibition of the reception may be made by a vibration or by a sound (such as a beep, alarm, voice, etc.). In this manner, the user can easily recognize that the other display is in the sleep mode.

Otherwise, if it is determined that the touched touch panel is not in the sleep mode (NO branch of inquiry task S109), the CPU 100 executes the processing corresponding to activation of the touched object (task S111).

The user can touch the sleep keys 40 and 41 to set the display (touch panel), to the sleep mode, where the display in sleep mode is not given an operational input performing a predetermined deactivating operation. In this manner, the display in the sleep mode is prevented from receiving an operational input. Therefore, if the user touches the display in sleep mode when the user operates the other display in normal mode the cell phone is not erroneously operated. Thereby, probability of an erroneous operation by the user is reduced, while more convenience is provided for the user.

In addition, since the luminance of the display set to the sleep mode is reduced, the power consumption can be reduced. Therefore, the battery life can be extended, thereby increasing operating time of the cell phone 300. Moreover, by reducing the luminance of the display, the user can recognize that the display is in the sleep mode. Furthermore, since the sleep keys 40 and 41 are arranged as a soft key on the displays 11 and 21, respectively, the correspondence between the respective displays 11 and 12 and the sleep keys 40 and 41 is clear, and the sleep keys 40 and 41 are easily operated. In addition, it is not necessary to separately provide a hard sleep key on a position, in which the correspondence with the display is clear. In this manner structure of the cell phone 300 is simplified.

Figure 7:
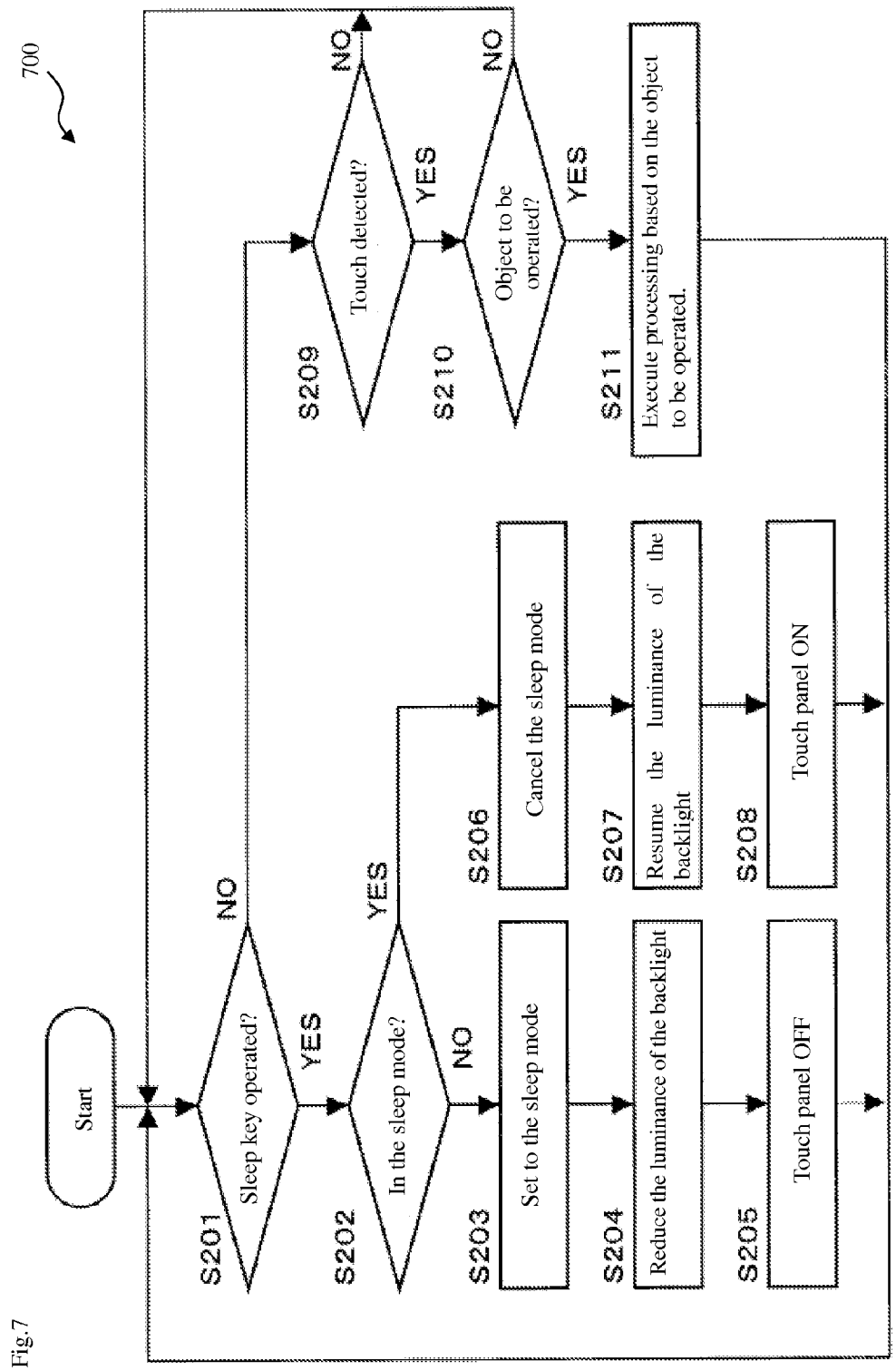
FIG. 7 is an illustration of an exemplary flowchart showing a reception processing of an operation according to an embodiment of the disclosure.

FIG. 7 is an illustration of an exemplary flowchart showing a reception process 700 of an operational input by the CPU 100 according to an embodiment of the disclosure. FIGS. 8A-8B are illustrations of exemplary diagrams showing a display example of a first display 11 and a second display 21 when a sleep mode is set according to an embodiment of the disclosure. The various tasks performed in connection with the process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a CPU such as the CPU 100 in which the computer-readable medium is stored. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. For illustrative purposes, the following description of process 700 may refer to elements mentioned above in connection with FIGS. 1-6. In practical embodiments, portions of process 700 may be performed by different elements of the cell phone 1 and 300 for example the a CPU 100, a memory module 200, an image encoder 301, an audio encoder 302, a key input circuit 303, a communication module 304, a backlight drive circuit 305, an image decoder 306, an audio decoder 307, an external speaker 308, a battery 309, and a power supply 310, first touch panel 12, the second touch panel 22, the first sleep key 40, the second sleep key 41 etc. The process 700 may have functions, material, and structures that are similar to the embodiments shown in FIGS. 1-6. Therefore common features, functions, and elements may not be redundantly described here.

In an embodiment, the sleep keys 40 and 41 are arranged as a soft key on the displays 11 and 21, respectively. Alternatively, a first sleep key 42 is arranged on the lower right side of the first display 11 on the first cabinet 1. Similarly, a second sleep key 43 is arranged on the lower right side of the second display 21 on the second cabinet 2. These sleep keys 42 and 43 are provided in the vicinity of the corresponding display. In this way, it becomes clearly understood that the sleep keys 42 and 43 correspond to the displays 11 and 21, respectively; hence, the operability by the user improves.

Process 700 may begin by the CPU 100 detecting whether or not the first sleep key 42 or the second sleep key 43 is touched (task S201). If either one of the sleep keys is operated (YES branch of inquiry task S201), the CPU 100 determines whether or not the display corresponding to the operated sleep key is currently in the sleep mode (task S202).

If it is determined that the display is not in the sleep mode (NO branch of inquiry task 202), the CPU 100 sets that display (touch panel) to the sleep mode (task S203), and then reduces the luminance of the backlight of that display (task S204). Moreover, the CPU turns off the touch panel arranged on that display (task S205).

Otherwise, if it is determined that the display corresponding to the operated sleep key is currently in the sleep mode (YES branch of inquiry task S202), the CPU 100 cancels the sleep mode of that display (task S206) to return the luminance of the backlight of that display to a normal state (task S207). Moreover, the CPU turns on the touch panel arranged on that display to resume its function (task S208).

Figure 8:
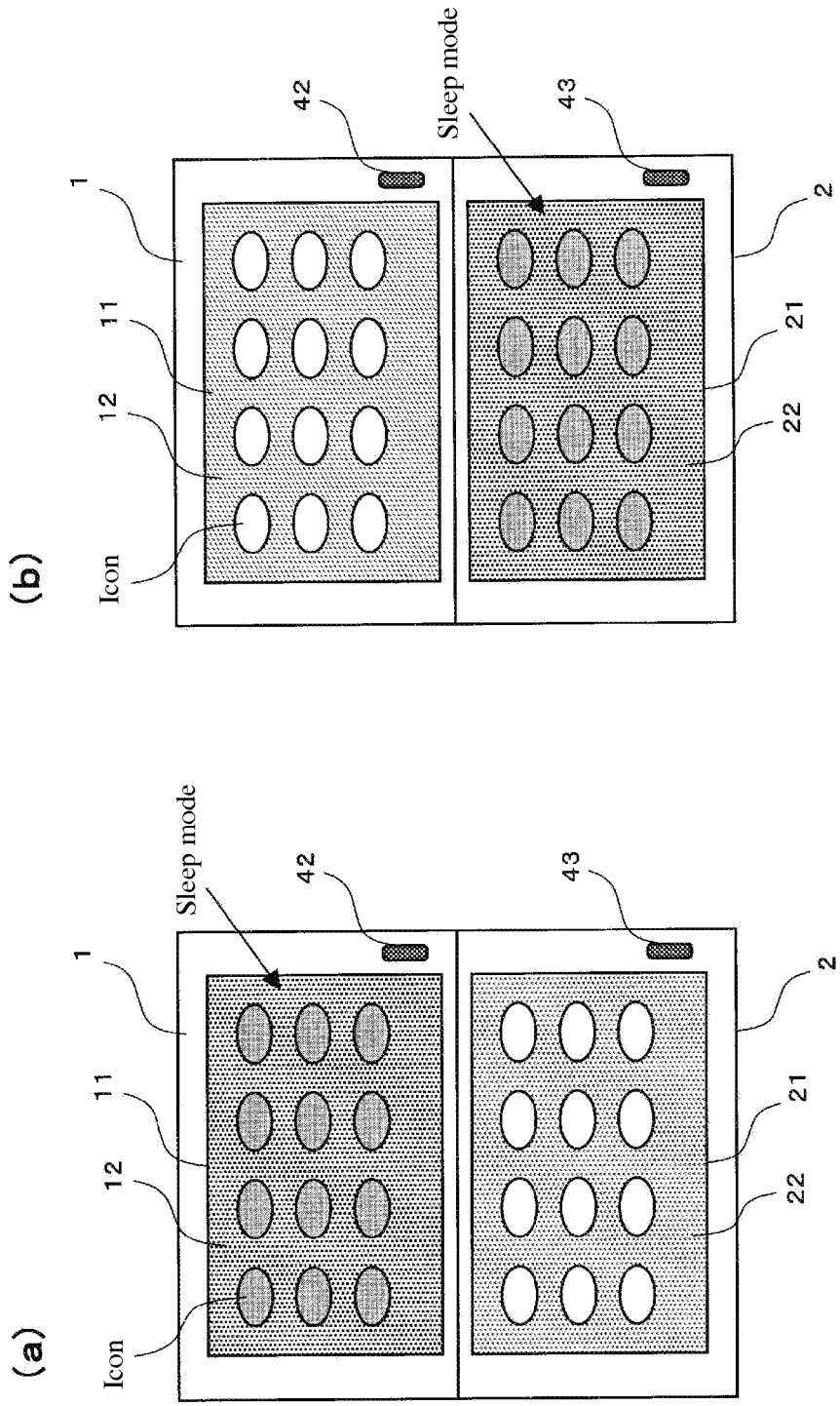
FIGS. 8A-8B are illustrations of exemplary diagrams showing a display example of a first display and a second display if a sleep mode is set according to an embodiment of the disclosure.

In a normal state, when the sleep key 42 is operated by the user, as shown in FIG. 8(*a*), the first display 11 is set to the sleep mode. At the same time, the luminance of the first display 11 is reduced, and the display becomes dark. In addition, the first touch panel 12 stops functioning. Otherwise, when the sleep key 43 is operated by the user, as shown in FIG. 8(*b*), the second display 21 is set to the sleep mode. At the same time, the luminance of the second display 21 is reduced, and the display becomes dark. In addition, the second touch panel 22 stops functioning. Even in the state in which the luminance is reduced, the display is not turned off, and objects such as icons can be continuously presented on the display.

If it is determined that the sleep key 42, 43 are not operated in the task S201 (NO branch of inquiry task S201), the CPU 100 detects whether or not the first touch panel 12 or the second touch panel 22 is touched (task S209). At this time, when either of the displays is set to the sleep mode, its corresponding touch panel is turned off, and does not function; hence, even when the touch panel is touched, the position signal is not output.

When a touch is detected through the touch panel that is on (YES branch of inquiry task S209), CPU 100 determines whether or not the object to be operated is touched (task S210). Then, when it is determined that the object to be operated is touched (YES branch of inquiry task S209), the CPU executes the processing based on the object to be operated (task S211). Otherwise, when the touch panel that is on is not touched and the touch is not detected (NO branch of inquiry task S209), the CPU 100 again determines whether or not the first sleep key 42 or the second sleep key 43 is operated (task S201).

In addition, even when a touch is detected through the touch panel being touched that is turned on (YES branch of inquiry task S209), when it is not determined that the object to be operated is touched, the CPU 100 again determines whether or not the first sleep key 42 or the second sleep key 43 is operated (task S201).

In an embodiment, since the sleep key is not provided on the touch panels 12 and 22, the touch panel that is not to be operated can be turned off. Therefore, as it is not necessary to supply power to the touch panel, the power consumption can be further reduced, and the operating time of the cell phone can be lengthened.

Two operation key of the operation key group 37 provided on the support 3 may also be used as a sleep key. For example, the most backward operation key 37*a* is also used as a sleep key for the first display 11, and the most forward operation key 37*c* is also used as a sleep key for the second display 21. In this case, these two operation keys 37*a* and 37*c* function as a sleep key when a special operation is performed on them. For example, when an operation, in which keys 37*a* and 37*c* are continuously pressed for several seconds (so called press and hold), etc., is performed, it functions as a sleep key.

Figure 9:
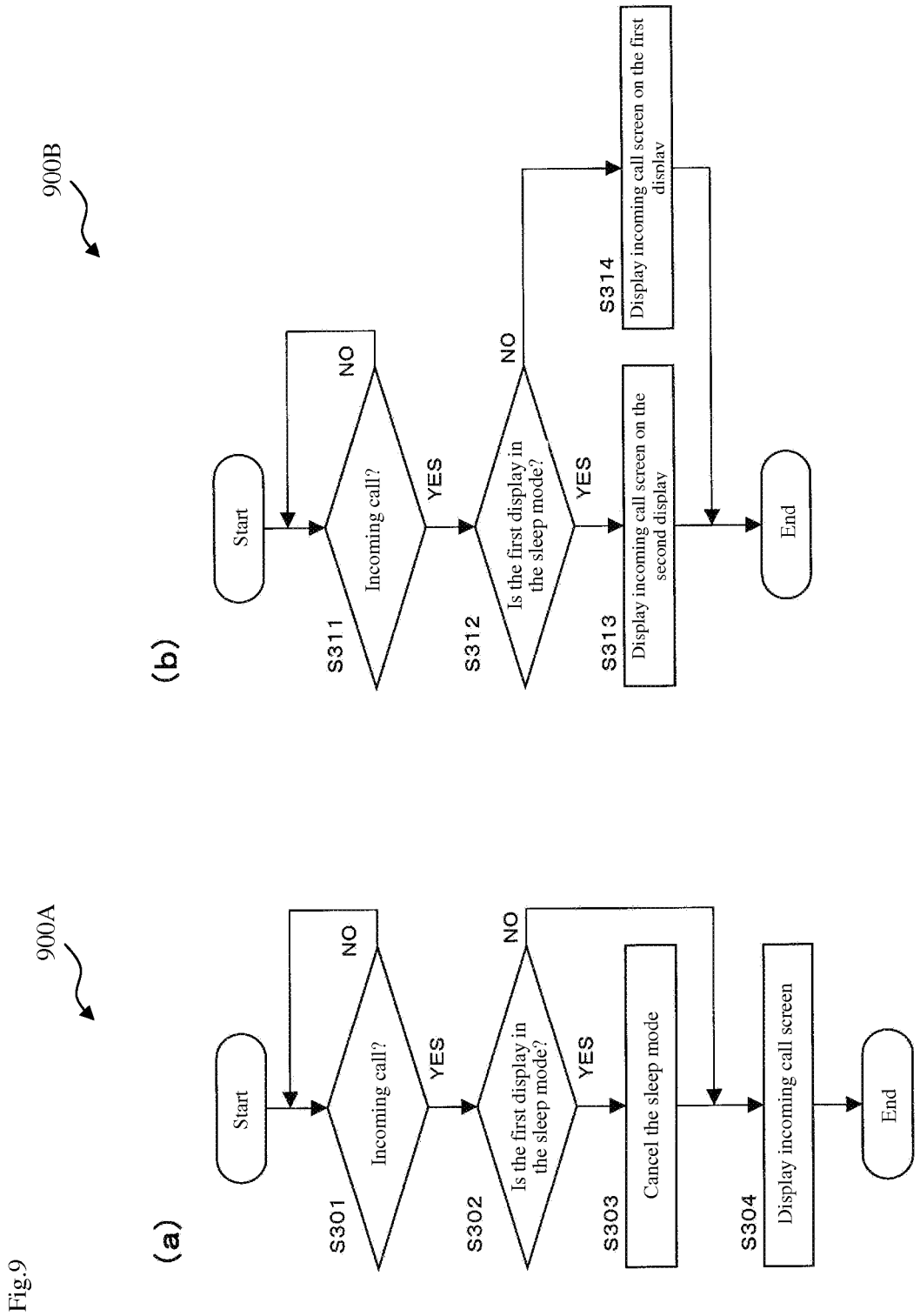
FIGS. 9A-9B are illustrations of exemplary flow charts showing a processing when there is an interrupt due to an incoming call if the sleep mode is set according to an embodiment according to an embodiment of the disclosure.

FIGS. 9A-9B are illustrations of exemplary flowcharts showing processes 900A-900B when there is an interrupt due to an incoming call when the sleep mode is set according to an embodiment according to an embodiment of the disclosure. FIG. 9(*a*) shows a first operational example, and FIG. 9(*b*) shows a second operational example. FIGS. 10A-10B are illustrations of exemplary diagrams showing a display when processing of a first operation is executed according to an embodiment of the disclosure. FIGS. 11A-11D are illustrations of a display example when processing of a second operation example is executed according to an embodiment of the disclosure. The processing of these first operational example and second operational example is executed by the CPU 100 in parallel to the reception processing in the above FIG. 5 and FIG. 7. The various tasks performed in connection with the processes 900A-900B may be performed by software, hardware, firmware, a computer-readable medium having computer executable instructions for performing the process method, or any combination thereof. The processes 900A-900B may be recorded in a computer-readable medium such as a semiconductor memory, a magnetic disk, an optical disk, and the like, and can be accessed and executed, for example, by a CPU such as the CPU 100 in which the computer-readable medium is stored. It should be appreciated that processes 900A-900B may include any number of additional or alternative tasks, the tasks shown in FIGS. 9A-9B need not be performed in the illustrated order, and processes 900A-900B may be incorporated into a more comprehensive procedure or process having additional functionality not described in detail herein. For illustrative purposes, the following description of processes 900A-900B may refer to elements mentioned above in connection with FIGS. 1-8. In practical embodiments, portions of processes 900A-900B may be performed by different elements of the cell phone 1 and 300 for example the a CPU 100, a memory module 200, an image encoder 301, an audio encoder 302, a key input circuit 303, a communication module 304, a backlight drive circuit 305, an image decoder 306, an audio decoder 307, an external speaker 308, a battery 309, and a power supply 310, first touch panel 12, the second touch panel 22, the first sleep key 40, the second sleep key 41 etc. The processes 900A-900B may have functions, material, and structures that are similar to the embodiments shown in FIGS. 1-8. Therefore common features, functions, and elements may not be redundantly described here.

The first operational example is explained with reference to FIG. 9(*a*) and FIG. 10. In the first operational example, it is assumed that the screen for incoming calls is displayed on the first display 11 exposed to the outside.

The CPU 100 monitors whether or not there is an incoming call (task S301). Then, when there is an incoming phone call (YES branch of inquiry task S301), the CPU determines whether or not the first display 11 is in the sleep mode (task S302). When there is not an incoming call (NO branch of inquiry task S301), it resumes the monitoring of whether or not there is an incoming call (task S302).

Figure 10:
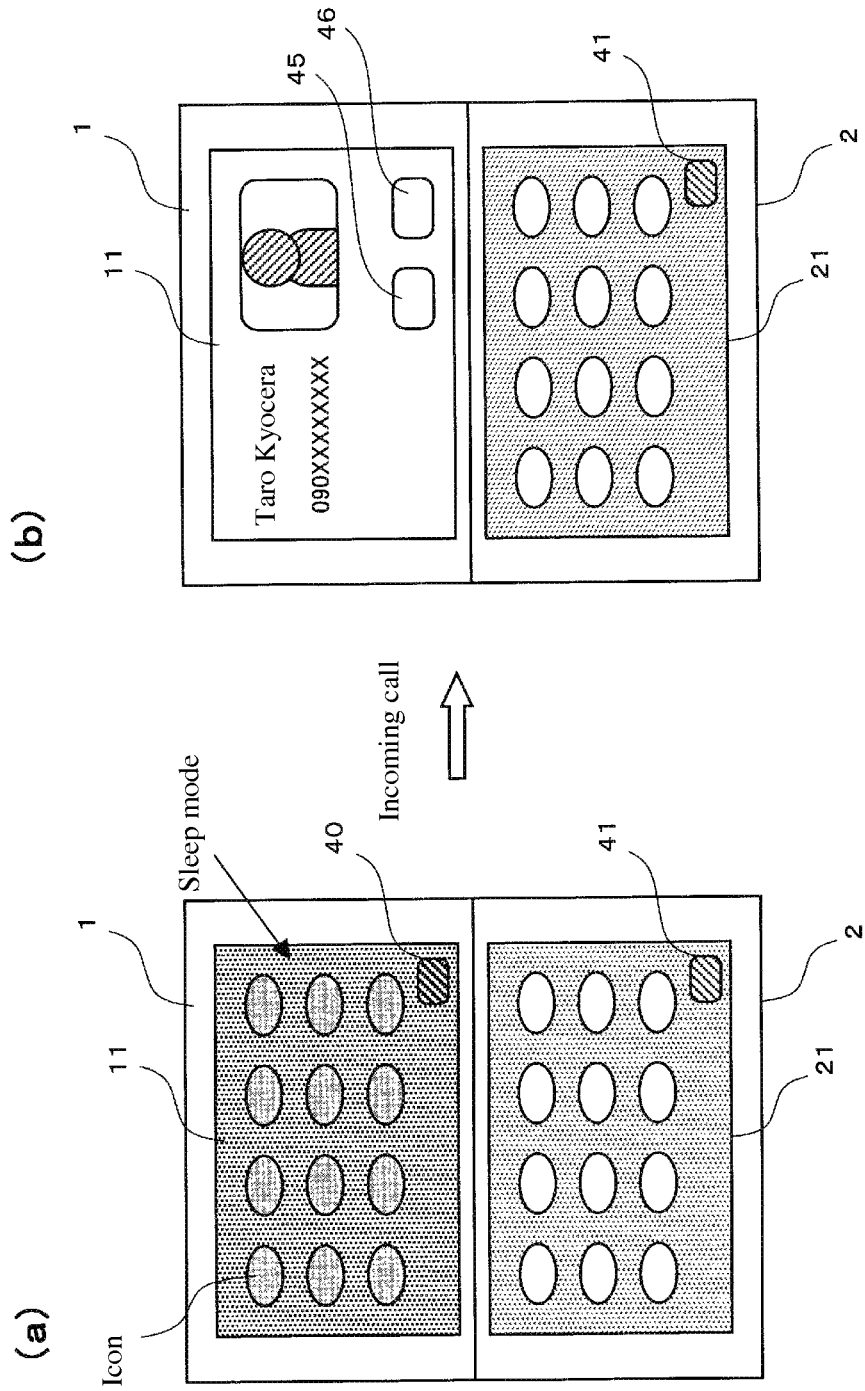
FIGS. 10A-10B are illustrations of exemplary diagrams showing a display if processing of a first operation is executed according to an embodiment of the disclosure.

As shown in FIG. 10(*a*), when there is an incoming call while the first display 11 is in the sleep mode (YES branch of inquiry task S302), the CPU 100 displays, upon canceling the sleep mode (task S303), the screen for incoming calls on the first display 11 (task S304).

When there is an incoming call while the first display 11 is not in the sleep mode (NO branch of inquiry task S302), the CPU 100 displays the screen for incoming calls on the first display 11 (task S304).

As shown in FIG. 10(*b*), information of the origin of transmission (such as the name, photograph, phone number of the caller, etc.) is displayed on the screen for incoming calls. In addition, an off-hook key 45 to start talking and an on-hook key 46 to stop talking are arranged on the screen for incoming calls as a soft key. At this time, since the sleep mode of the first display 11 is already cancelled, or it is not in the sleep mode, the operation of the off-hook key 45 and the on-hook key 46 can be accepted by the CPU 100.

Therefore, when there is an incoming call, the user can answer the phone by operating the off-hook key 45 without operating the sleep key 40.

Next, the second operational example is explained with reference to FIG. 9(*b*) and FIG. 11. In this operational example, it is assumed that the screen for incoming calls is displayed on the first display 11.

The CPU 100 monitors whether or not there is an incoming call (task S311). Then, when there is an incoming call (YES branch of inquiry task S311), the CPU determines whether or not the first display 11 is in the sleep mode (task S312). When there is no incoming call (NO branch of inquiry task S311), it resumes the monitoring of whether or not there was an incoming phone call (task S311).

Figure 11:
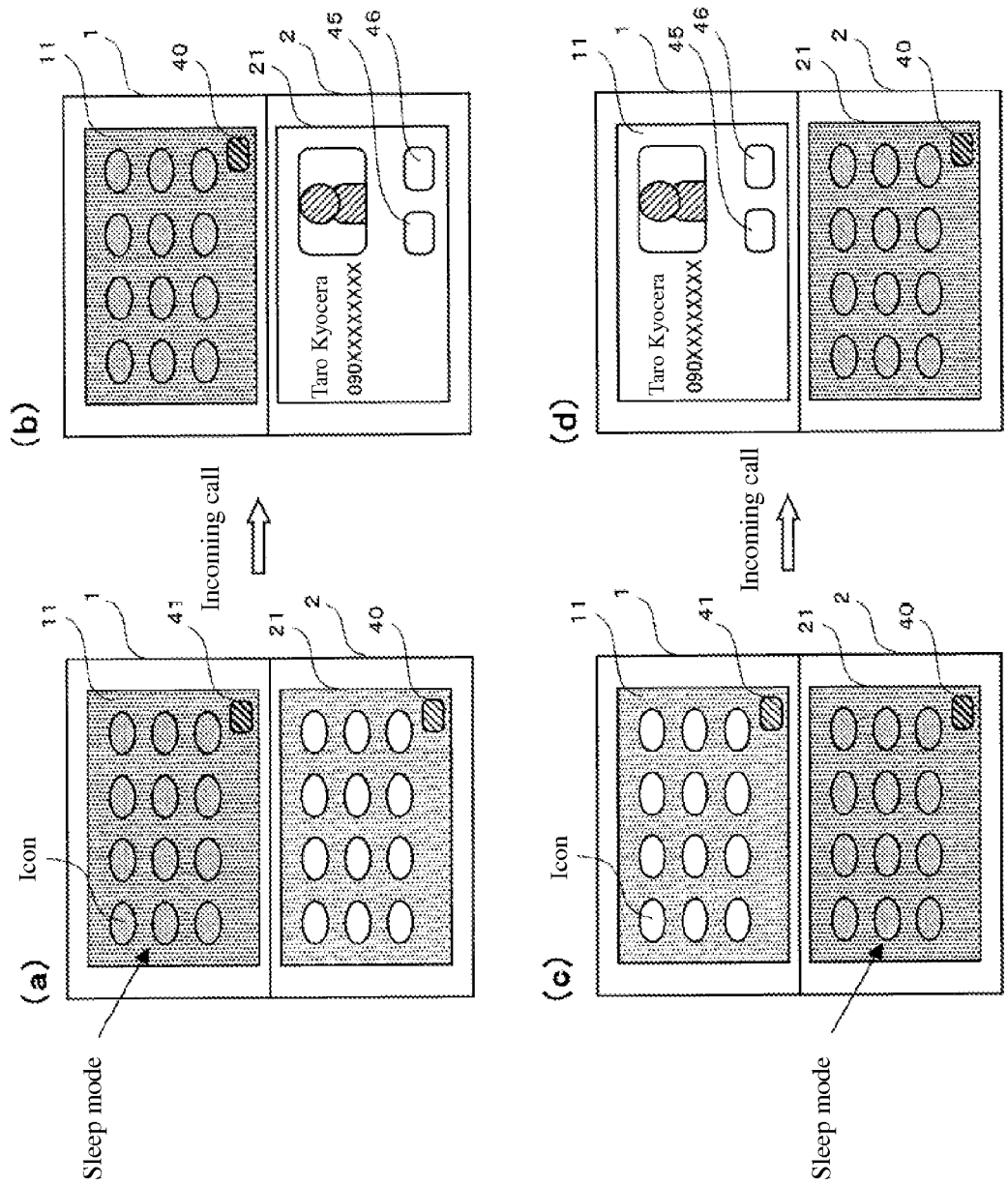
FIGS. 11A-11D are illustrations of a display example if processing of a second operation example is executed according to an embodiment of the disclosure.

As shown in FIG. 11(*a*), when there is an incoming call while the first display 11 is in the sleep mode and the second display 21 is not in the sleep mode, the CPU 100 determines that the first display 11 is in the sleep mode (YES branch of inquiry task S312), and displays the screen for incoming calls on the second display 21 as shown in FIG. 11(*b*) (task S313).

On the other hand, as shown in FIG. 11(*c*), when there is an incoming call while the second display 21 is in the sleep mode and the first display 11 is not in the sleep mode, the CPU 100 determines that the first display 11 is not in the sleep mode (NO branch of inquiry task S312), and displays the screen for incoming calls on the first display 11 as shown in FIG. 11(*d*) (task S314).

When neither displays 11 and 21 are in the sleep mode, the screen for incoming calls is displayed on the first display 11. In addition, when both displays 11 and 21 are in the sleep mode, it is desired that the sleep mode of either one of the displays be cancelled, and then the screen for incoming calls be displayed on that display. In this manner, even in the case of the second operational example, the user can quickly answer the phone when there is an incoming call.

Although the case in which there is an incoming call is explained in the above embodiments, even in the case in which there is other interrupt processing, the CPU 100 can display the screen for that interrupt processing in a similar manner to FIG. 9. For example, when an alarm is set for the time of, for example, a conference, there is an interrupt of alarm annunciation at that time, and the CPU 100 may display the notification screen indicating, for example, details of the conference along with the alarm. In this case, keys for the notification screen, for example, keys for displaying the details of the conference, are arranged on the screen as a soft key, and those keys are made operable.

With regard to the CPU 100 in the above embodiments, the CPU 100 sets or cancels the sleep mode according to the operation of the sleep keys 40 and 41 as a soft key arranged on the first display 11 and the second display 21. However, the CPU 100 may set or cancel the sleep mode according to, for example, the detection of a touch to the displays 11 and 21, i.e., a touch to the touch panels 12 and 22 (for example, 3 or more touches in a short period of time, continuous touch for several seconds, etc.), and not according to the operation of the soft key (sleep keys 40 and 41 as an icon).

In addition, it is possible that the sleep keys 40 and 41 that are soft keys and the sleep keys 42 and 43 that are hard keys are both arranged on each of the cabinets 1 and 2, and the sleep mode is set when the sleep keys 40 and 41 are operated, and the sleep mode is cancelled when the sleep keys 42 and 43 are operated. In this case, when the sleep mode is set, the touch panel to be an object is turned off. In this manner, even when the sleep keys 42 and 43 are used for the canceling operation, the touch panels 11 and 22 can be turned off; hence, the power consumption can be reduced.

In the above embodiments, the sleep mode is set when the sleep keys 42 and 43 are operated once, and the sleep mode is cancelled when the sleep keys 42 and 43 are operated again. Alternatively, as in the flow chart in FIG. 12, the sleep mode may be set only during the time in which the sleep key is pressed, and the sleep mode may be cancelled during other time.

Figure 12:
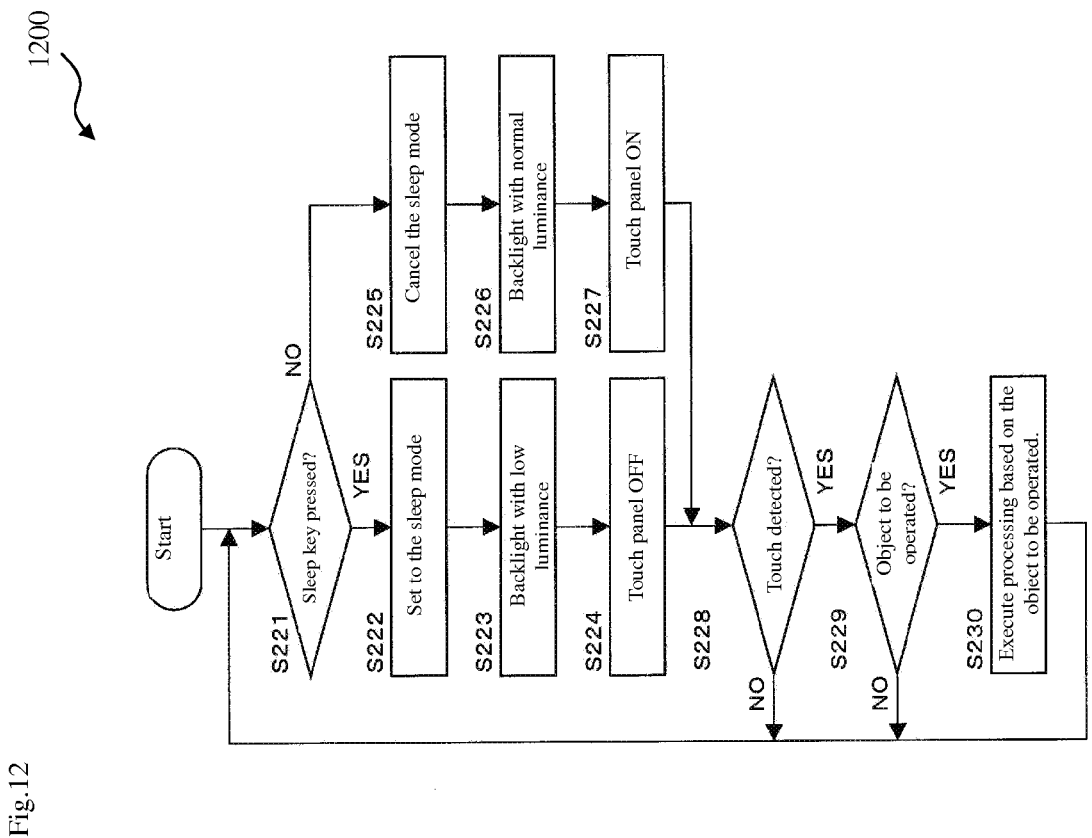
FIG. 12 is an illustration of an exemplary flowchart showing reception processing of an operation according to an embodiment of the disclosure.

FIG. 12 is an illustration of an exemplary a flowchart showing reception processing of an operation according to an embodiment of the disclosure. As shown in FIG. 12, while the sleep key is being pressed (YES branch of inquiry task S221), the CPU 100 turns the corresponding display to the state, in which the sleep mode is set (task S222), and lights up its backlight with a low luminance (task S223). Then it turns the corresponding touch panel to the off state (task S224).

On the other hand, while the sleep key is not being pressed, or when the pressing of the sleep key is cancelled (NO branch of inquiry task S221), the CPU 100 turns the corresponding display to the state, in which the sleep mode is cancelled (task S225), and lights up its backlight with a normal luminance (task S226). Subsequently, it turns the corresponding touch panel to the on state (task S227).

Next, when a touch to the touch panel that is not in the sleep mode is detected (YES branch of inquiry task S228), the CPU 100 executes, if it is an object to be operated such as an icon (YES branch of inquiry task S229), the processing based on that object to be operated is executed (task S230).

Otherwise, when a touch to the touch panel that is not in the sleep mode is not detected (NO branch of inquiry task S229), the CPU 100 again determines whether or not the sleep key is being pressed.

In addition, even when a touch to the touch panel that is not in the sleep mode is detected (YES branch of inquiry task S228), if it is not an object to be operated such as an icon (YES branch of inquiry task S229), the CPU 100 again determines whether or not the sleep key is being pressed.

Thus, the reduction of the power consumption can be achieved in a similar manner to the above embodiments.

In addition, in the above embodiments, the first display 11 is set to or cancelled from the sleep mode when the sleep key 40 arranged on the first display 11 is touched, and the second display 21 is set to or cancelled from the sleep mode when the sleep key 41 arranged on the second display 21 was touched. However, the second display 21 on the other side may be set to or cancelled from the sleep mode when the sleep key 40 arranged on the first display 11 is touched, and the first display 11 on the other side may be set to or cancelled from the sleep mode when the sleep key 41 arranged on the second display 21 is touched. In this case, since the touch panel on the display side that is set for the sleep mode is turned off, the power consumption can be reduced.

A capacitive touch panel is used in the present embodiments, however, the embodiments are not limited to the capacitive touch panel, and resistive touch panel, pressure-sensitive touch panel, etc., may be used. However, in cases in which a capacitive touch panel is used, when its sensitivity is high, detection is realized without touching the panel, even when a finger is in close vicinity to the panel surface, hence, an erroneous operation can easily occur. Therefore, when a capacitive touch panel is used, the significance of the present disclosure is more apparent.

Moreover, the first and second detection modules are not limited to a touch panel. For example, in place of a touch panel, a sensor, which detects an object to be operated such as an icon displayed on the display module through radio waves or images without touching the display part, may be used.

In addition, although the cases in which icons are displayed on the first display 11 and the second display 21, have been exemplified in the above embodiments, any screens may be displayed on each display. For example, the present disclosure can be applied on cases, in which a screen for e-mails is displayed on the first display 11 and a movie is displayed on the second display 21, and on cases, in which different application screens are displayed on both displays.

Moreover, although the first display 11 and the second display 21 are configured to be vertically lined up in the above embodiments, the first display 11 and the second display 21 may be configured such that they are lined up horizontally.

Furthermore, the present disclosure is applied for a so-called sliding-type cell phone in the above embodiments. However, the present disclosure may be applied for a so-called folding type cell phone, as well.

Other than these, various changes can be made to embodiments of the present disclosure as necessary within the scope of the technical idea indicated in the claims.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile terminal device comprising:
a display module comprising a first display module and a second display module;
a detection module operable to detect an input on a display screen displayed on the display module, the detection module comprising a first detection module corresponding to the first display module, and a second detection module corresponding to the second display module; and
a control processing module operable to:
perform control based on the input detected by the detection module, and
prohibit reception of input through the detection module in accordance with a predefined deactivating operation, wherein
upon detection of an incoming call while reception of input on the first display module and reception of input on the second display module are prohibited, the control processing module is operable to cancel the prohibition of the reception of the input on one display module out of the first display module and the second display module, operable to cause an incoming call screen to be displayed on the display module on which the prohibition of the reception of the input has been canceled, and operable to enable reception of input, through the detection module, on an object for initiating a call, the object being included in the incoming call screen,
upon detection of an incoming call while reception of input on the first display module is prohibited, the control processing module is operable to cause the incoming call screen to be displayed on the second display module, and
upon detection of an incoming call while reception of input on the second display module is prohibited, the control processing module is operable to cause the incoming call screen to be displayed on the first display module.

2. The mobile terminal device according to claim 1, wherein
the control processing module is further operable to reduce luminance of the display module in accordance with the deactivating operation.

3. The mobile terminal device according to claim 1, wherein
the control processing module is further operable to prohibit reception of input through the detection module in response to the deactivating operation performed by providing an input to the display screen.

4. The mobile terminal device according to claim 1, wherein
the control processing module is further operable to prohibit reception of input through a detection module out of the first detection module and the second detection module in response to the deactivating operation performed on the detection module.

5. The mobile terminal device according to claim 4, wherein
the control processing module is further operable to prohibit reception of input through one detection module out of the first detection module and the second detection module in response to input through the other detection module, and operable to cancel the prohibition of the reception of the input through the one detection module in response to input through the other detection module.

6. The mobile terminal device according to claim 1, further comprising
an operation module located separate from the detection module and operable to perform a cancelling operation to cancel prohibition of reception of input through the detection module, wherein
the control processing module is further operable to set the detection module to a non-operating state in accordance with the deactivating operation, and operable to return the detection module to an operating state from the non-operating state in response to the cancelling operation.

7. The mobile terminal device according to claim 1, further comprising
an operation module located separate from the detection module and operable to perform an operation of prohibiting reception of input through the detection module and canceling the prohibition of the reception of the input through detection module.

8. A mobile terminal device comprising:
a display module comprising a first display module and a second display module;
a detection module operable to detect an input on a display screen displayed on the display module, the detection module comprising a first detection module corresponding to the first display module, and a second detection module corresponding to the second display module; and
a control processing module operable to:
perform control based on the input detected by the detection module; and
prohibit reception of input through the detection module in accordance with a certain deactivating operation, wherein
upon detection of an incoming call while reception of input on the first display module and reception of input on the second display module are prohibited, the control processing module is operable to cancel the prohibition of the reception of the input on one display module out of the first display module and the second display module, operable to cause an incoming call screen to be displayed on the display module on which the prohibition of the reception of the input has been canceled, and operable to enable reception of input, through the detection module, on an object for initiating a call, the object being included in the incoming call screen, and
the control processing module is further operable to prohibit reception of input through one detection module out of the first detection module and the second detection module in response to input through the other detection module, and operable to cancel the prohibition of the reception of the input through the one detection module in response to input through the other detection module.

* * * * *